US009352527B2

(12) United States Patent
Barredo et al.

(10) Patent No.: US 9,352,527 B2
(45) Date of Patent: May 31, 2016

(54) MULTI-PLY DISINTEGRATABLE ABSORBENT SHEET, ASSOCIATED ROLL AND ASSOCIATED MANUFACTURING PROCESS

(75) Inventors: Donald Barredo, Ingersheim (FR); Pierre Graff, Wolfgantzen (FR); Pierre Probst, Ammerschwihr (FR)

(73) Assignee: SCA TISSUE FRANCE, Saint-Ouen (FR)

( * ) Notice: Subject to any disclaimer, the term of this patent is extended or adjusted under 35 U.S.C. 154(b) by 0 days.

(21) Appl. No.: 13/408,927

(22) Filed: Feb. 29, 2012

(65) Prior Publication Data

US 2012/0164426 A1 Jun. 28, 2012

Related U.S. Application Data

(63) Continuation of application No. 12/297,121, filed as application No. PCT/FR2007/000625 on Apr. 13, 2007, now Pat. No. 8,182,907.

(30) Foreign Application Priority Data

Apr. 14, 2006 (EP) .................................... 06290613

(51) Int. Cl.
| | | |
|---|---|---|
| *B32B 7/02* | (2006.01) | |
| *B31F 1/07* | (2006.01) | |
| *A47K 10/16* | (2006.01) | |
| *D21H 27/00* | (2006.01) | |
| *D21H 27/40* | (2006.01) | |

(52) U.S. Cl.
CPC . *B31F 1/07* (2013.01); *A47K 10/16* (2013.01); *D21H 27/007* (2013.01); *D21H 27/40* (2013.01); *B31F 2201/0738* (2013.01); *B31F 2201/0761* (2013.01); *Y10T 156/1023* (2015.01); *Y10T 156/1039* (2015.01); *Y10T 428/19* (2015.01); *Y10T 428/24612* (2015.01); *Y10T 428/24942* (2015.01)

(58) Field of Classification Search
CPC ............... B32B 3/00; B32B 7/02; B31F 1/07; Y10T 156/1023; Y10T 156/1039; Y10T 428/19; Y10T 428/24612; Y10T 428/24942
USPC .................... 428/57, 172, 212, 220
See application file for complete search history.

(56) References Cited

U.S. PATENT DOCUMENTS

| 901,723 | A | 10/1908 | Morse |
|---|---|---|---|
| D40,046 | S | 6/1909 | Stone |
| D40,322 | S | 10/1909 | Gair |
| D40,916 | S | 9/1910 | Gair |
| D63,341 | S | 11/1923 | Vandergaw et al. |
| D66,158 | S | 12/1924 | Vandergaw et al. |
| D66,341 | S | 12/1924 | Vandergaw et al. |
| D78,011 | S | 3/1929 | Currier et al. |
| D78,641 | S | 5/1929 | Manus |
| 1,983,813 | A | 12/1934 | Rosen |
| D104,006 | S | 4/1937 | Goodstein |
| D113,598 | S | 2/1939 | Lawson |
| D118,716 | S | 1/1940 | Zito |
| D127,228 | S | 5/1941 | Erhard |
| D130,965 | S | 12/1941 | Fitch |
| D154,344 | S | 6/1949 | Stapler |
| D159,479 | S | 8/1950 | Feder |
| 2,956,564 | A | 10/1960 | Ohara |
| 3,377,224 | A | 4/1968 | Gresham et al. |
| 3,581,744 | A | 6/1971 | Voss et al. |
| 3,654,629 | A | 4/1972 | Crisman et al. |
| 3,738,905 | A | 6/1973 | Thomas |
| 3,791,082 | A | 2/1974 | Bowling |
| D243,471 | S | 2/1977 | Schroeder |
| 4,009,313 | A * | 2/1977 | Crawford et al. ............. 442/123 |
| 4,307,141 | A | 12/1981 | Walbrun |
| 4,445,693 | A | 5/1984 | Angwin |
| 4,521,166 | A | 6/1985 | Phillips |
| 4,601,938 | A | 7/1986 | Deacon et al. |
| 4,759,967 | A | 7/1988 | Bauernfeing |
| 4,978,565 | A | 12/1990 | Pigneul et al. |
| 4,986,329 | A | 1/1991 | Kupchunos |
| 5,114,787 | A * | 5/1992 | Chaplin et al. ................ 442/361 |
| 5,173,351 | A | 12/1992 | Ruppel et al. |
| 5,289,748 | A | 3/1994 | Kuchta et al. |
| 5,325,555 | A | 7/1994 | Whitley |
| D367,764 | S | 3/1996 | Makoui et al. |

(Continued)

FOREIGN PATENT DOCUMENTS

| DE | 2238005 | | 2/1974 |
|---|---|---|---|
| EP | 0264676 | A1 | 4/1988 |
| EP | 0864014 | B1 | 1/2002 |
| EP | 1353010 | A1 | 10/2003 |
| EP | 1400199 | A1 | 3/2004 |
| EP | 1428654 | A1 | 6/2004 |
| EP | 1845193 | A1 | 10/2007 |
| FR | 2653793 | A1 | 5/1991 |
| FR | 2775698 | A1 | 9/1999 |
| WO | 9720107 | A1 | 6/1997 |
| WO | 9852745 | A1 | 11/1998 |
| WO | 2006027810 | A1 | 3/2006 |

OTHER PUBLICATIONS

International Serach Report and Written Opinion for PCT/FR2007/000625, dated Aug. 21, 2007, pp. 1-14.
International Preliminary Report on Patentability for PCT Application No. PCT/FR2007/000625, dated Dec. 3, 2008, pp. 1-7.
United States Office Action for U.S. Appl. No. 12/297,121, dated Dec. 21, 2011, pp. 1-28.

*Primary Examiner* — Aaron Austin
*Assistant Examiner* — Lawrence Ferguson
(74) *Attorney, Agent, or Firm* — Drinker Biddle & Reath LLP

(57) ABSTRACT

A substantially rectangular multi-ply disintegratable absorbent sheet based on tissue includes at least three plies and has certain characteristics of strength in the cross direction of the sheet, strength in the machine direction of the sheet, a basis weight of the sheet, a thickness of the sheet, a flexibility of the sheet, an absorption of the sheet and a mean thickness of one ply of the sheet.

8 Claims, 5 Drawing Sheets

(56) References Cited

U.S. PATENT DOCUMENTS

| | | |
|---|---|---|
| 5,795,632 A | 8/1998 | Buchalter |
| 5,809,805 A | 9/1998 | Palmer et al. |
| 5,934,995 A | 8/1999 | Morris et al. |
| D414,345 S | 9/1999 | Barnholtz et al. |
| 5,947,817 A | 9/1999 | Morris et al. |
| 5,972,456 A | 10/1999 | Esquivel |
| D421,528 S | 3/2000 | Shakora |
| 6,036,181 A | 3/2000 | Workman |
| D425,354 S | 5/2000 | Rogers et al. |
| 6,106,928 A | 8/2000 | Laurent et al. |
| D436,737 S | 1/2001 | Presutti |
| 6,294,036 B1 | 9/2001 | Loubinoux et al. |
| D450,934 S | 11/2001 | Duritsch et al. |
| 6,348,131 B1 | 2/2002 | Kershaw et al. |
| 6,461,705 B2 | 10/2002 | Eichhorn |
| 6,599,614 B1 | 7/2003 | Roussel et al. |
| 6,727,004 B2 | 4/2004 | Goulet et al. |
| D494,766 S | 8/2004 | Boerschinger et al. |
| 6,805,766 B1 | 10/2004 | Roussel et al. |
| D502,004 S | 2/2005 | Olson et al. |
| 6,884,492 B2 | 4/2005 | Basler et al. |
| 6,913,530 B2 | 7/2005 | Morris et al. |
| D508,613 S | 8/2005 | Knobloch et al. |
| D510,434 S | 10/2005 | Carlucci et al. |
| 6,979,485 B2 | 12/2005 | Price et al. |
| 6,991,844 B2 | 1/2006 | LeBoeuf et al. |
| D518,647 S | 4/2006 | Kressner et al. |
| D518,965 S | 4/2006 | Enderby |
| D521,250 S | 5/2006 | Knobloch et al. |
| D521,251 S | 5/2006 | Enderby |
| 7,052,234 B2 | 5/2006 | Wells et al. |
| D523,644 S | 6/2006 | Knobloch et al. |
| 7,056,569 B2 | 6/2006 | Price et al. |
| 7,078,088 B2 | 7/2006 | Price et al. |
| D530,520 S | 10/2006 | Leclere et al. |
| D535,107 S | 1/2007 | Knobloch et al. |
| 7,208,216 B2 | 4/2007 | Ackerman et al. |
| 7,244,064 B2 | 7/2007 | Sullivan, Jr. |
| 7,247,360 B1 | 7/2007 | Besner et al. |
| 7,285,504 B2 * | 10/2007 | Jones et al. .................. 442/149 |
| 7,348,067 B1 | 3/2008 | Hoffman |
| 7,545,971 B2 | 6/2009 | Shakespeare |
| 7,662,257 B2 | 2/2010 | Edwards et al. |
| D612,156 S | 3/2010 | Barredo et al. |
| D612,157 S | 3/2010 | Barredo et al. |
| 7,846,296 B2 | 12/2010 | Luu et al. |
| 7,914,866 B2 | 3/2011 | Shannon et al. |
| 7,918,964 B2 | 4/2011 | Edwards et al. |
| 2002/0028230 A1 | 3/2002 | Eichhorn et al. |
| 2003/0000665 A1 * | 1/2003 | Takai et al. .................. 162/115 |
| 2003/0021954 A1 | 1/2003 | Graff |
| 2003/0203164 A1 | 10/2003 | Healy et al. |
| 2003/0215605 A1 | 11/2003 | Muller |
| 2004/0018369 A1 | 1/2004 | Goulet et al. |
| 2004/0077471 A1 | 4/2004 | Verbruggen et al. |
| 2004/0103591 A1 | 6/2004 | Chornenky et al. |
| 2006/0062972 A1 | 3/2006 | Lefebvre Du Grosriez et al. |
| 2006/0113049 A1 | 6/2006 | Knobloch et al. |
| 2006/0233468 A1 | 10/2006 | Jacoby et al. |
| 2006/0233469 A1 | 10/2006 | Jacoby et al. |
| 2006/0233470 A1 | 10/2006 | Jacoby et al. |
| 2006/0237154 A1 | 10/2006 | Edwards et al. |
| 2006/0269706 A1 | 11/2006 | Shannon et al. |
| 2007/0122595 A1 | 5/2007 | Basler et al. |
| 2008/0044644 A1 | 2/2008 | Luu et al. |
| 2009/0120598 A1 | 5/2009 | Edwards et al. |
| 2009/0162597 A1 | 6/2009 | Barredo et al. |
| 2010/0035011 A1 | 2/2010 | Graff |
| 2010/0051219 A1 | 3/2010 | Barredo |
| 2010/0112264 A1 | 5/2010 | Barredo |
| 2010/0170647 A1 | 7/2010 | Edwards et al. |
| 2010/0224338 A1 | 9/2010 | Harper et al. |

\* cited by examiner

MULTI-PLY DISINTEGRATABLE ABSORBENT SHEET, ASSOCIATED ROLL AND ASSOCIATED MANUFACTURING PROCESS

CROSS REFERENCE TO RELATED APPLICATIONS

This Application is a Continuation of U.S. application Ser. No. 12/297,121, which was entitled "Multi-Ply Disintegratable Absorbent Sheet, Associated Roll and Associated Manufacturing Process" and has been allowed as of Feb. 24, 2012, the entire contents of which are incorporated herein by reference. U.S. application Ser. No. 12/297,121 was a National Stage entry of International Application No. PCT/FR2007/000625, filed Apr. 13, 2007, which claims priority to European Patent Application No. 06290613.6, filed on Apr. 14, 2006, the priorities of which are hereby claimed. The disclosures of all prior applications are incorporated herein by reference in their entirety.

BACKGROUND OF THE INVENTION

The present invention relates to the field of sheets of absorbent paper made of fibrous material such as tissue, comprising at least three plies, preferably five or more.

The preferred application of the invention is that of paper for sanitary or domestic or even cosmetic use, such as bathroom tissue, but also kitchen towel, paper handkerchiefs or alternatively the "formats" that can be used for cleansing the skin and/or removing makeup.

In general, this type of product needs to display a certain number of characteristics such as softness, flexibility, dry and/or wet strength, absorption, thickness, and also disintegratability, etc.

One or more others of these parameters will take precedence depending on the anticipated application, and known products thus display either good softness or excellent absorption, or perfect strength, etc.

Furthermore, the visual appearance is also a parameter that needs to be taken into consideration: the esthetic look of known absorbent products can be achieved by embossing the sheet or alternatively by printing patterns using ink, these patterns varying in their visibility and harmonious, or alternatively by combining both techniques.

Where toilet paper is concerned, the objective will be to obtain good strength, a certain thickness and great softness. The strength and softness may seem difficult to reconcile but by combining certain fibers and or certain basis weights with a treatment such as calendering, good results can be obtained.

However, the known products do not exhibit all the desired characteristics listed above; a choice is therefore generally made, leading to a product that displays one or two of the above listed technical characteristics.

BRIEF DESCRIPTION OF THE INVENTION

It is an object of the present invention simultaneously to achieve good performance across all of the characteristics.

One approach which may appear simple and obvious is to associate a great number of plies to form a very thick absorbent sheet. This approach has hitherto remained a theoretical one because technical problems occur when attempts to associate four or more plies are made: either it is necessary to provide several adhesive application stations, or it is necessary to provide mechanical association means that entail a strong pressure on each of the plies of which the sheet is formed.

The adhesive application stations each lead to problems of soiling, maintenance, floor space on the manufacturing line, etc., leading to additional costs and/or complications in the manufacture.

On the other hand, excessively high pressures lead to premature wear of the manufacturing rollers or cylinders, crush the embossed patterns and/or lead to vibrations which prove to be detrimental not only to the cylinders themselves but which also have a negative effect on the quality and reliability of the sheets produced.

Patent application WO 97/20107 describes a sheet of multi-ply absorbent paper in which the plies are associated in the converting phase using a method known as "dry marking" which consists in deforming the sheet through its thickness under stress by passing it between an engraved roller with a rigid external surface and a smooth roller, the external surface of which is less hard than that of the engraved roller.

This then yields a multi-ply product where the plies are associated purely mechanically, and which is marked in certain regions.

Furthermore, sheets of absorbent paper which are very thick and/or used simultaneously in excessive quantity may lead to blocked pipes.

However, there is a need, particularly although not exclusively as far as bathroom tissue is concerned, for a paper that is at once thicker, strong, soft, flexible, absorbent and disintegrates readily.

Indeed, with a paper that displays all of these characteristics, the user can use just one format (or sheet) at a time, that is to say for each wipe, hence making not insignificant savings when it is borne in mind that with known bathroom tissue, several (four or five) sheets are commonly employed by the consumers on each use.

Thus, by using fewer sheets each time, the risk of blockages in the pipes is greatly reduced.

The present invention proposes a solution which is unobvious, simple, reliable and can be adapted to suit several types of production.

Bathroom tissue is a preferred application of the invention but the invention can also be used for other products such as formats for cleaning, removing makeup or other skincare applications, and as kitchen towel, paper handkerchiefs, etc.

A subject of the present invention is a substantially rectangular multi-ply disintegrable absorbent sheet based on tissue and comprising at least three plies.

Furthermore, the sheet has a coefficient $K_{NOVE}=R_{SM} \times R_{ST} \times A \times G \times e^{(12 \times (E+Ep))} \times (1/e^{(Sp)}) > 75\,000$ where RST=strength in the cross direction of the sheet, in N/m RSM=strength in the machine direction of the sheet, in N/m G=basis weight of the sheet in kg/m2

E=thickness of the sheet in mm

Sp=flexibility of the sheet in N

A=absorption of the sheet in kg/m2

EP=mean thickness of one ply of the sheet in mm, EP being greater than 0.115 mm.

According to another feature, the absorbent sheet also has a coefficient $K_D = K_{NOVE} \times e^{(D)} > 100\,000$, D being a softness value ranging between −3 and +3.0.

Notable softness is thus obtained according to the invention for a sheet which is also both thick and flexible.

According to the invention, the absorbent sheet has a tensile strength in the machine direction greater than about 400 N/m, preferably ranging between 400 and 1000 N/m, preferentially higher than 700 N/m.

Preferentially, the sheet has a tensile strength in the cross direction ranging between about 200 N/m and about 500 N/m, preferentially higher than 300 N/m.

Thus, such an absorbent sheet simultaneously displays properties of softness, thickness and exceptional tensile strength both in the machine and in the cross directions.

Particularly, the sheet may comprise between 3 and 12 plies, preferentially between 3 and 9 plies; it being possible for each ply itself to comprise a group of plies.

Advantageously, the sheet may have a thickness greater than about 0.75 mm and less than about 1.5 mm.

This thickness encourages the user to use a small number of sheets, preferably just one, each time.

Particularly, the basis weight of the sheets according to the invention is greater than or equal to about 70 g/m2 and preferentially less than 150 g/m2.

The sheets may have a length of about 140 mm and a width of about 110 mm, particularly for uses as bathroom tissue.

A format such as this is somewhat larger than the format of known sheets, hence yet again discouraging the use of several sheets at a time.

Furthermore, in the context of its use as bathroom tissue, the rolls according to the invention may comprise between 60 and 120 sheets, which is markedly fewer than conventional rolls of toilet paper. Of course, given the intrinsic characteristics of each sheet, this does not cause the user to bear an additional cost because one of the significant advantages of the invention lies in the use of just one sheet instead of three, four or even more each time.

This then yields a significant financial saving, which is very much liked and appreciated by consumers.

Furthermore, in spite of the great thickness of the sheets, rolls can be formed without any problems. This is made possible by the intrinsic characteristics of the sheets according to the invention which simultaneously display remarkable elasticity and remarkable flexibility which are both entirely compatible with rolling, even at the center of the roll where the radii of curvature are the smallest.

Furthermore, another subject of the invention is a process for manufacturing disintegratable absorbent sheets which consists in embossing at least three of the plies that form said sheet separately and differently, in chemically associating said sheets using a single adhesive-coating unit then in mechanically associating the collection of plies using a press cylinder.

Without departing from the scope of the invention, the manufacturing process may consist, in the wet phase, in throwing a suspension of papermaking fibers onto a fabric in order to form a web, in transferring this web to the surface of a porous drying cylinder, in making jets of air from said cylinder to pass through the web, then in transferring the dry web thus formed onto a creping cylinder. Several plies are thus formed independently of one another and then, later, in the so-called dry phase, said plies are associated with one another by mechanical deformation.

According to a preferred embodiment of the invention, at least one of the external surfaces of the sheet is obtained using this process.

With these processes, the minimum specific pressure for associating the plies is of the order of 3 kg/mm2.

The invention is also aimed at a multi-ply disintegratable absorbent sheet comprising plies obtained by one of the processes described above and/or plies obtained by the other of the aforementioned processes.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
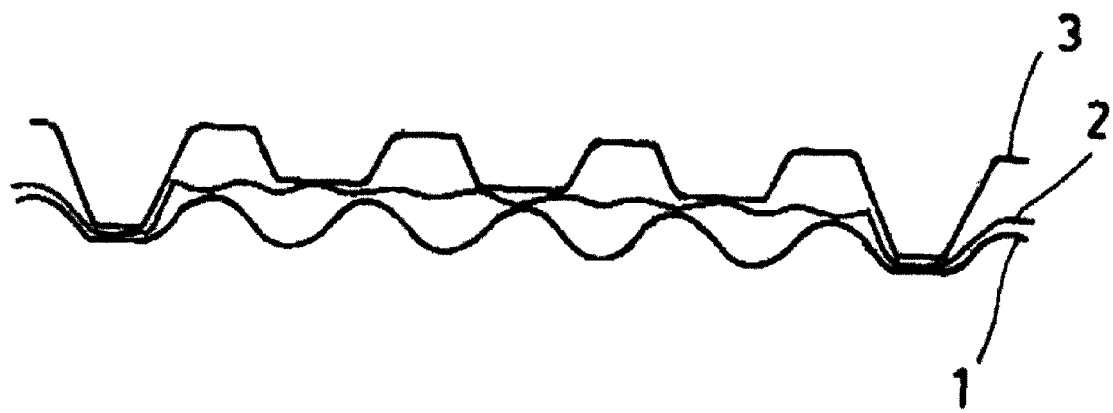
FIG. 1 is a schematic section through the thickness of a sheet produced according to one of the embodiments of the invention.
Figure 3:
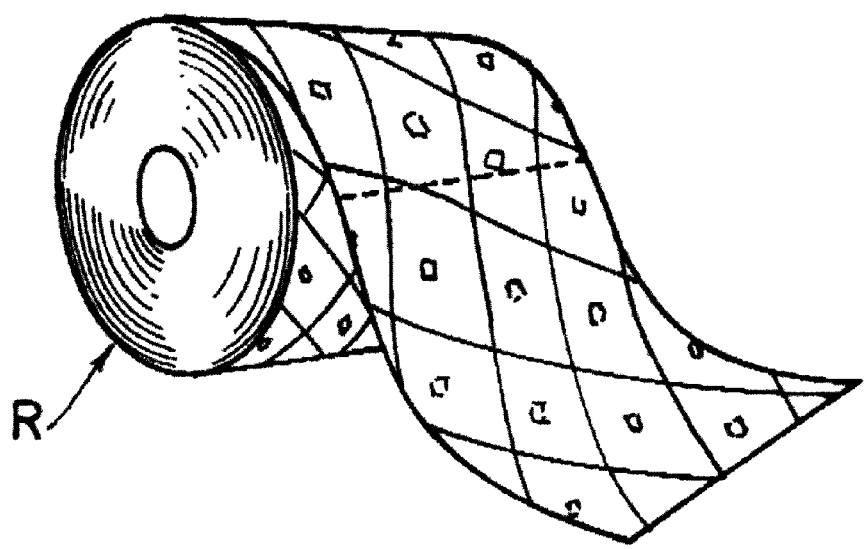
FIG. 3 is a simplified perspective view of a roll obtained according to the invention.

According to FIG. 1, a multi-ply sheet according to the invention may display a structure having at least three plies or groups of plies 1, 2, 3.

According to one of the embodiments of the invention, each ply or group of plies is embossed independently (as will be explained in greater detail in relation to FIG. 2) and differently.

By way of illustration, the first ply (or group of plies) 1 may be an outer ply, embossed with a so-called decorative pattern; the second ply 2 (or group of plies) is positioned on the inside of the sheet and comprises coarse microembossing; the expression "coarse microembossing" must be understood for example to mean microembossing comprising approximately 25 protrusions per $cm^2$. This ply confers and gives the sheet thickness and a certain stiffness and good mechanical integrity.

The third ply 3 (or group of plies) forms the second external surface of the sheet and may advantageously have microembossing, that is to say embossing comprising at least 30 protrusions per $cm^2$.

The third ply thus makes it possible to limit the two sided effect, that is to say the visible trace of the embossing of the first ply on the third ply, and above all avoids there being a sensation that is unpleasant to the touch.

Each ply may or may not have the same nature.

The expression "group of plies" means that each of said first, second and/or third aforementioned plies may in fact consist of one or several plies.

Furthermore, the plies 1, 2, 3 are glued together at dots and/or lines of glue 4. The nature of the glue and its dilution ratio are known per se and can be readily determined by the person skilled in the art as part of his everyday know how.

Advantageously, the glue is deposited on one of the internal surfaces of the sheet as can be seen in FIG. 1.

Figure 2:
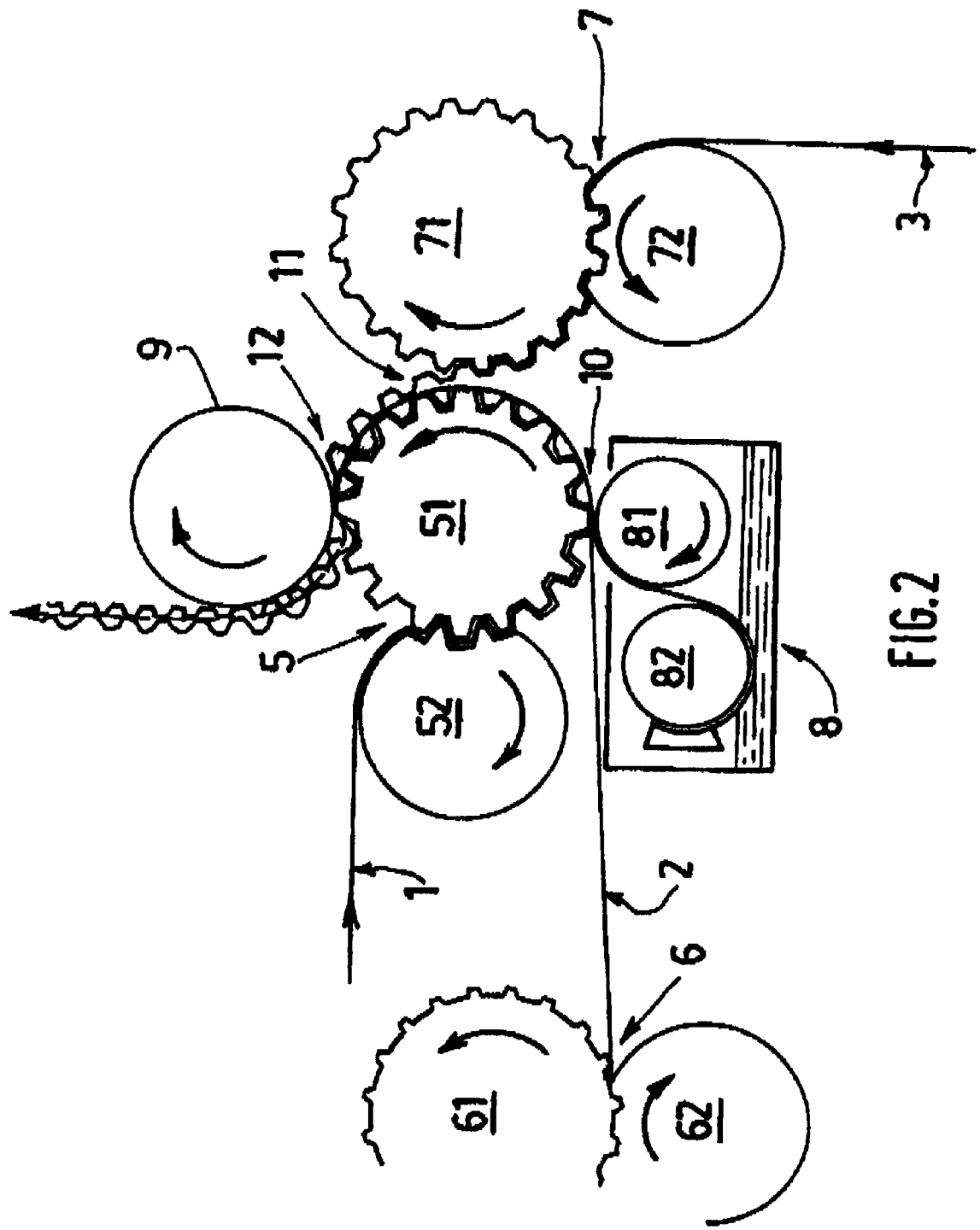
FIG. 2 is a diagram illustrating an installation for the manufacture of the sheets according to one of the embodiments of the invention.

FIG. 2 schematically shows an installation capable of producing sheets according to one embodiment of the invention. The associated process will be described in relation to this FIG. 2.

Thus, each of the plies 1, 2, 3 is embossed in a way known per se between an engraved steel cylinder 51, 61, 71 and a rubber cylinder 52, 62, 72.

Each of the plies was wet laid beforehand using the technology well known to those skilled in the art of the CWP (conventional wet press) type.

By way of illustration, the first ply 1 is embossed in a nip 5 between the first engraved cylinder 51 and the first smooth cylinder 52, the engraving of the first cylinder 51 being such that a somewhat decorative embossing pattern (patterns) is produced on the first ply 1 (or group of plies) which will constitute one of the external surfaces of the sheet.

The other external surface of the sheet consists of the third ply 3 (or group of plies) which is embossed in a nip 7 between the third engraved cylinder 71 and the third smooth cylinder 72. The engraving of the third engraved cylinder 71 is such that microembossing is for example formed on the third ply (or group of plies) 3. In the conventional way, microembossing is defined by a protrusion density greater than or equal to 30 per cm$^2$.

Furthermore, the second ply 2 (or group of plies) is inserted between the first and third ply.

The second ply is embossed between the second embossing cylinder 61 and the second smooth cylinder 62 at a second nip 6.

Preferentially, the embossing obtained is coarse microembossing as already mentioned hereinabove.

Once embossed, the second ply 2 is directed towards an adhesive-coating unit 8 known per se which essentially comprises a doctor cylinder 82 and an applicator cylinder 81.

The adhesive-coating unit 8 is preferentially positioned under the first engraved cylinder 51 so that the applicator cylinder 81 collaborates with the first engraved cylinder 51 at a nip 10.

More specifically, the applicator cylinder 81 bears against the engraved cylinder 51 via the second ply 2 and the first ply 1 superposed. The plunger cylinder 82 transfers the adhesive from the glue reserve of the unit 8 to the applicator cylinder 81. The applicator cylinder 81 exerts a certain pressure on the engraved cylinder 51 at the distal surface of the protrusions of the first embossed ply 1. With sufficient pressure, the glue passes through the second ply 2 and the association of plies 1 and 2 is thereby improved.

In an embodiment variant, the glue applicator cylinder 81 may have an engraved surface with a view to applying glue only to part of the tops of the engravings. By reducing the area coated with glue it is thus possible to improve the flexibility of the end product.

The adhesive 4 used may be a standard glue of the PVA type or of the hot melt type. By way of example, use was made of a glue marketed by the company Swift. This glue was diluted in water in optimum proportions to obtain appropriate transfer to the plies.

In another embodiment, appropriate means are used to spray a hot melt adhesive to each of the faces of the second ply. In this case, the adhesive needs to be applied before the ply 2 comes into contact with the other two plies.

According to yet another embodiment, an aqueous adhesive is applied by spraying onto the central ply 2.

Having passed through the nip 10, that is to say once they have been associated with one another, the plies 1 and 2 are associated with the third embossed ply 3.

The plies pass first of all (in the direction of the arrow 11) between the first engraved cylinder 51 and the third engraved cylinder 71 and then are associated at a nip 12 via spots of glue 4 by virtue of a marrying cylinder 9 which collaborates with the first engraved cylinder 51.

This association is performed between the marrying cylinder 9, which is less hard than the first embossing cylinder 51, at a specific pressure of the order of 10 kg/mm$^2$.

It should be pointed out that, according to the invention embodiment just described, the at least three plies (or group of plies) that form the sheet have each undergone a different deformation during the transformation or converting phase.

This characteristic introduces both body, gentleness and an harmonious look to each sheet.

Without departing from the scope of the invention, the plies may be associated by knurling them between (hard) engraved knurling wheels and smooth cylinders which are less hard. Deformation by knurling is of a mechanical type but then affects only strips of greater or lesser width on the plies.

In general, association by knurling is not as good as association by embossing and/or adhesive and the impression of relief defined by a knurling operation is not as visible as it is when the association is done by embossing and/or adhesive.

By way of illustration, U.S. Pat. No. 3,377,224 discloses a conventional knurling process.

In accordance with the invention, association of the plies may be performed by a so-called "dry marking" technique for example according to the teachings of patent EP 864 014 B1: in this known method, the plies that are to be associated are passed in turn between a substantially elastic receiving first cylinder and an engraved cylinder and then between this same cylinder and a substantially elastic fixed second cylinder; since the receiving first cylinder and the engraved cylinder are able to move and the elastic second cylinder is fixed, the association of plies obtained is such that the sheet exhibits a smooth face and a face of reduced thickness bearing impressed patterns.

The particular feature of the process according to the invention is the ability to associate at least three plies or groups of plies. More specifically, the total number of plies may be N=n+m+p; n, m, p each being an integer number, preferentially and nonlimitingly ranging between 1 and 3. Favorable results have been achieved with rolls produced using sheets comprising between 3 and 12 plies.

According to the invention, the plies are advantageously associated using a single deposition of glue, when each of the plies is obtained by a wet lay technique of the CWP type.

Another advantageous feature of the invention lies in the fact that the absorbent sheet can disintegrate, that is to say readily breaks up in water, in spite of the high number of plies of which it is formed. The distingratability (disintegration) within the meaning of the invention is, in particular, that defined by French standard NF Q 34-020. This standard applies to items for sanitary and domestic use, particularly bathroom tissue and relates to how readily such products disintegrate.

According to a notable feature of the invention, the absorbent sheets have a coefficient $K_{NOVE}=R_{SM} \times R_{ST} \times A \times G \times e^{(12 \times (E+E_P))} \times (1/e^{(Sp)}) > 75\,000$ where $R_{ST}$=tensile strength of the sheet in the cross direction of the sheet, in N/m $R_{SM}$=tensile strength of the sheet in the machine direction of the sheet, in N/m G=basis weight of the sheet in kg/m$^2$ E=thickness of the sheet in mm Sp=flexibility of the sheet in N A=absorption of the sheet in kg/m$^2$ $E_P$=mean thickness of one ply of the sheet in mm, $E_P$ being greater than 0.115 mm.

All the sheets the characteristics of which meet this technical definition simultaneously display thickness, softness and good strength. It is entirely unexpected for these characteristics to be found simultaneously in an absorbent sheet that disintegrates readily.

This is why the conceivable applications of the invention are numerous and varied: bathroom tissue, kitchen towel, cleaning product, makeup remover.

The "tensile strength" or, more specifically, the "resistance to break by tensile" defined in the standard NF EN 12625-4 part 4 is the maximum tensile force withstood per unit width by a specimen of tissue paper or tissue product until it breaks, in a tensile test. The principle of this test is that a specimen 50 mm wide and at least 150 mm long is stretched to breaking point at a constant rate of elongation of 50 mm/min.

To do this, the specimens to be evaluated are placed in turn between two jaws of a tester (as defined precisely in the standard EN 12625-4): at least 20 specimens are subjected to the test.

The jaws of the tester separate from one another at a constant rate of about 50 mm/min and all the significant values of the forces upon breakage of the specimens are recorded.

Next, the mean of said breaking forces: F (expressed in N) is calculated in order to determine the mean tensile strength Fm expressed in N/m such that:

$$Fm = \frac{F \times 10^3}{wi}$$

where wi=the initial width of the specimen (normally 50 mm).

As far as the flexibility Sp of the sheet is concerned, this being expressed in N, this is determined by a so-called "ring and rod" method which consists in passing the sheet of surface area S through a hole of a diameter slightly greater than the large diameter of a cone frustum that the sheet will wrap around. The tensile force on the sheet before and during its passage through the hole is measured and plotted on a graph on which the movement of the test cage is plotted on the abscissa axis (in mm) and the tensile force is plotted on the ordinate axis (in N). As the sheet passes through the hole, the gradient of the curve changes and the magnitude of the force at the point of inflection is noted. This value is representative of the flexibility Sp (in N) of said sheet because it is inversely proportional to said force.

Figure 4:
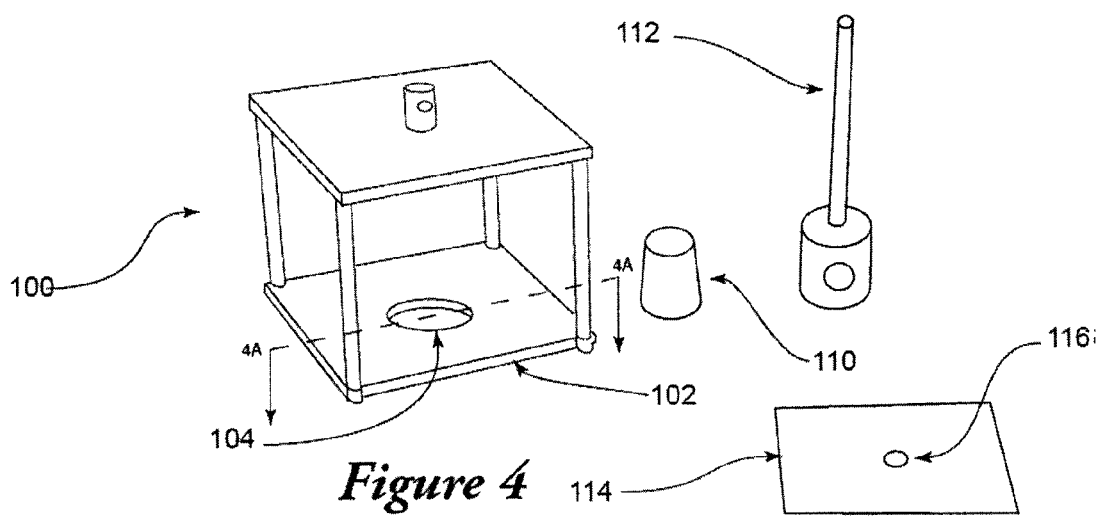
FIG. 4 is a schematic perspective of the test mechanism for measurement of Sp flexibility illustrating the cage, cone and rod along with the configuration for a standard test sample.
Figure 4A:
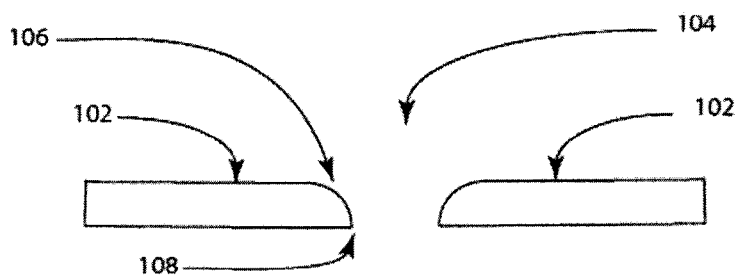
FIG. 4A is a sectional view illustrating the profile of flaring hole 104.
Figure 5:
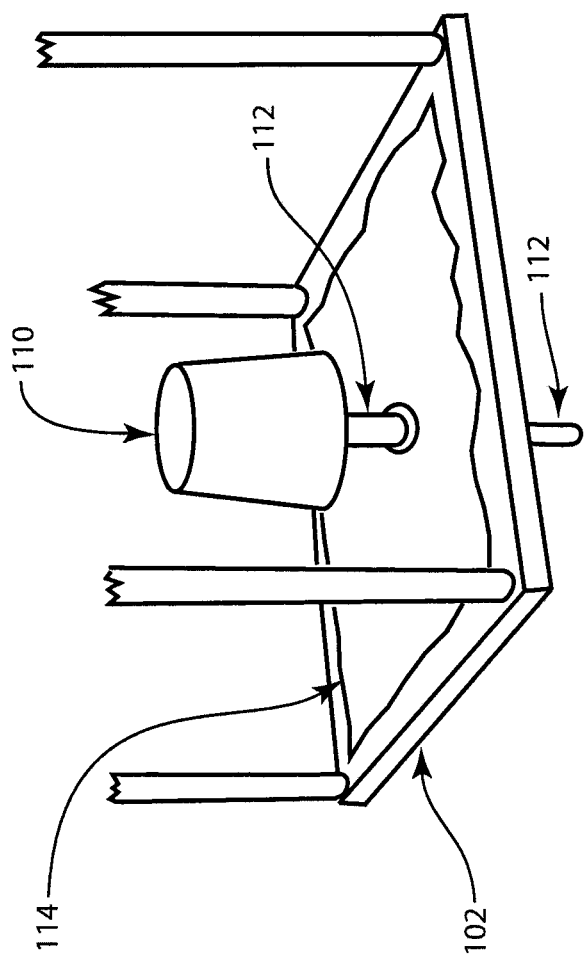
FIG. 5 is a schematic perspective of the test mechanism in operation measuring the Sp flexibility of a standard test sample as the cone pulls it through the hole in the cage.

The Sp flexibility of a test sample is measured using a test cage, cone (frustum) and rod as illustrated in FIG. 4 wherein test cage 100 has a height of 100 mm. Square base plate 102 is 120 mm×120 mm and has a thickness of 3 mm with flaring hole 104 formed therethrough. Mouth 106 of flaring hole 104 has a diameter of 40.5 mm while exit 108 has a diameter of 38.5 mm, the radius of curvature thereof being 33 mm so that the tangent to flaring hole 104 is horizontal at its opening and vertical at its exit. Cone (frustum) 110 is 25 mm in diameter at its top and 33 mm in diameter at its bottom with a height of 30 mm. Rod 112 has a diameter of 6 mm. Standard test sample 114 is a square 100 mm×100 mm with hole 116 having a diameter of 8 mm formed at its geometric center. In operation, test sample 114 is centered on base plate 102, rod 112 is passed upwardly through hole 116 in test sample 114 and secured to cone (frustum) 110 as shown in FIG. 5. As test cage is pulled upward by a dynamometer at a rate of 400 mm/min, the force required to allow the sheet to pass through the hole 104 and be wrapped around the cone is measured and the rigidity value obtained as indicated above at the first change of slope, is representative of the flexibility.

E is the measured thickness of the sheet obtained in accordance with European standard EN 12625-3 while Ep is the mean thickness of a ply of said sheet. More specifically, Ep is the total thickness of the sheet divided by the number of plies of which the sheet is formed; here considered to be greater than 0.115 mm.

A is the absorption of the sheet, in kg per m$^2$, that is to say the mass of liquid absorbed per unit area of the sheet. This parameter is determined on the basis of the conditions set out in the standard EN 12625-8 in that the absorption is thus measured in grams of liquid per gram of paper and if the basis weight of the paper is also known (as a weight per unit area), then multiplying these values together leads to an absorption in weight per unit area, as given in the table which follows.

Furthermore, as far as its softness is concerned, the absorbent product according to the invention can be characterized by a coefficient $K_D = K_{NOVE} \times c^{(D)} > 100\,000$, D being a number ranging between −3 and +3 and obtained according to the following test:

The individual testing the product chooses an adjective to describe the softness on a verbal scale. The method consists in allocating marks on this verbal scale according to the following look-up table, comparing each of the test sheets against the same control 0:

Verbal Scale/Score
Far less soft: −3
Less soft: −2
Probably less soft: −1
Not different: 0
Probably softer: +1
Softer: +2
Much softer: +3

The number of individuals who have chosen a given softness adjective is then multiplied by the score corresponding to that adjective. Then the points obtained are summed and divided by the total number of individuals in order to obtain an average score. This average score D, which lies between −3 and +3, gives the result of the test for a given product.

The table which follows gives values for various types of sheet obtained according to the invention, and for various known products.

| | Product | Absorption kg/m$^2$ | Thickness/ply mm | Number of plies | Basis weight kg/m$^2$ | Product thickness mm | Strength SM N/m | Strength ST N/m | Softness | Flexibility SP in N | $K_n$ (NOVE) | $K_D$ (softness) |
|---|---|---|---|---|---|---|---|---|---|---|---|---|
| Invention | 9 plies | 0.00120 | 0.123 | 9 | 0.148 | 1.11 | 1017 | 392 | 1.0 | 3.1 | 8965523 | 24370818 |
| | 5 plies (2TAD + 1CWP + 2TAD) | 0.00112 | 0.186 | 5 | 0.097 | 0.93 | 396 | 242 | 1.5 | 1.5 | 1514893 | 6789278 |
| | 7 plies | 0.00091 | 0.134 | 7 | 0.114 | 0.94 | 704 | 234 | 1.0 | 1.9 | 1068857 | 2905455 |
| | 6 plies | 0.00092 | 0.150 | 6 | 0.110 | 0.90 | 580 | 260 | 1.0 | 1.9 | 714713 | 1942791 |
| | 5 plies (1TAD + 3CWP + 1TAD) | 0.00096 | 0.154 | 5 | 0.090 | 0.77 | 439 | 365 | 1.5 | 1.5 | 200804 | 899942 |

-continued

|  | Product | Absorption kg/m² | Thickness/ ply mm | Number of plies | Basis weight kg/m² | Product thickness mm | Strength SM N/m | Strength ST N/m | Softness | Flexibility SP in N | $K_n$ (NOVE) | $K_D$ (softness) |
|---|---|---|---|---|---|---|---|---|---|---|---|---|
| GP prior art | Moltonel | 0.00045 | 0.207 | 3 | 0.051 | 0.62 | 350 | 180 | 1.2 | 0.7 | 15306 | 50819 |
|  | Royal | 0.00044 | 0.173 | 3 | 0.052 | 0.52 | 322 | 173 | 1.0 | 0.7 | 2579 | 7011 |
|  | Lotus comfort | 0.00035 | 0.160 | 2 | 0.041 | 0.32 | 235 | 97 | 2.2 | 0.2 | 82 | 743 |
|  | Lotus petite fleur | 0.00033 | 0.165 | 2 | 0.040 | 0.33 | 208 | 87 | 2.2 | 0.4 | 61 | 551 |

This table clearly reveals that the invention, particularly through the predefined coefficients $K_{NOVE}$ and $K_D$, differs from the prior art. The invention makes it possible simultaneously to improve the strength of the product, its thickness and its softness.

Furthermore, the sheets according to the invention are rectangular or substantially rectangular and have a tensile strength greater than about 700 N/m in their machine direction and at the same time greater than about 300 N/m in their cross direction.

These values can be considered to be high by comparison with known values: the 4-ply bathroom tissue marketed in Germany under the trade name "Servus" by Kimberly-Clark and which has a machine direction strength of 605 N/m is, for example, known. This is one of the highest values for bathroom tissue currently on the market, as demonstrated in the above table.

The tensile strength of this same paper in the cross direction lies at around 208 N/m.

In terms of tensile strength of each sheet in the cross direction, the product marketed in Germany under the trade name "Hakle Ultra Care" by Kimberly-Clark has a cross direction strength of about 283 N/m, which value is considered to be very high. By contrast, this paper has a machine direction strength of about 593 N/m.

Thus, the present invention displays exceptional tensile strength both machine and cross directions, together with other characteristics particularly the characteristic relating to the coefficient $K_{NOVE}$.

The characteristic relating to the tensile strength obtained according to the invention, which may or may not be combined with other characteristics, is favorable to allowing just one sheet to be used at a time, rather than several as has been the case hitherto.

Surprisingly and unexpectedly, the aforementioned strengths do not in any way diminish the softness of the product obtained, or its flexibility. The above table shows the improvement that the inventor has made in this area.

The preferred thickness exceeds 0.75 mm and is preferentially less than 1.5 mm while the basis weight is higher than about 70 g/m² and preferably lower than 150 g/m².

These values, which are high by comparison with most known products, heighten the "use one" nature of how the product is consumed.

In order to encourage sheet by sheet use still further, in the case of bathroom tissue, a size of 140 mm×110 mm is preferred. This dimension is somewhat larger than the usual size.

According to one embodiment of the invention, the absorbent sheets are joined together by precuts and together form a roll.

Given the intrinsic characteristics of the sheets as explained hereinabove in particular, the precut ratio may be chosen at about 0.15 per mm. This ratio allows each sheet to be separated easily and reliably.

In the case of an application to bathroom tissue, since the invention advantageously makes it possible to use just one sheet at a time, rolls comprising a lower number of sheets, that is to say between 60 and 120 rather than the customary 150, are formed; this reduction not in any way being penalizing to the user.

Furthermore, surprisingly and unexpectedly, the plies that form the sheets according to the invention do not separate from one another while the rolls are being formed. This seems in particular to be due to their good association and their good flexibility and elasticity.

According to another embodiment of the invention, the sheets may be stacked, then possibly wrapped to form packets.

Advantageously, according to the embodiment illustrated in FIG. 2 at the marrying device 9, the plies are associated with one another under a specific pressure of about 10 kg/mm². The specific pressure is more particularly applied to points and/or lines of adhesive coating uniformly distributed in the cross direction, along generatrices of the engraved first cylinder 51.

More specifically, the specific pressure needs to be constant over the entire developed surface area of the first cylinder 51 in order in particular to reduce cylinder vibration and therefore wear.

Depending on the final characteristics and nature of the sheet obtained, the specific pressure may vary from 3 to 16 kg/mm².

By way of illustration, sheets comprising 9 plies have been manufactured in accordance with the invention. Their basis weight is about 150 g/m² and their thickness is about 1 mm. The specific pressure at the marrying device was therefore about 11 kg/mm². The corresponding manufacturing process was carried out using an installation as depicted schematically in FIG. 2 and explained above. With respect to FIG. 1, each of the plies 1, 2 and 3 here consisted of three plies joined together, in a way known per se, upstream of each embossing unit (51, 52; 61, 62; 71, 72). Furthermore, each ply was wet laid beforehand using a CWP technique.

The multi-ply absorbent sheet according to the invention may comprise only plies formed in this way, which are ultimately associated with one another in accordance with FIG. 2.

Without departing from the scope of the invention, the plies may be wet laid using a TAD (through air drying) technique known per se and which consists, in general, in throwing a suspension of papermaking fibers onto a fabric in order to form a web, in transferring this web onto the surface of a porous drying cylinder, in forcing jets of air from said cylinder through the web and then in transferring the dry web thus formed onto a so-called creping cylinder. One or more plies are formed in this way.

Wet laid plies according to the teachings of application EP 1 353 010 may also form part of a sheet according to the invention.

The plies may be associated using an installation according to FIG. 2 which may or may not comprise an adhesive-coating unit.

The invention is also aimed at sheets comprising both plies obtained according to a conventional (CWP) technique and plies produced using the TAD technique.

The plies of the TAD type may constitute the two outer faces of such sheets. A very soft feel is therefore obtained. The inside plies may be produced using a CWP or some other technique.

Without departing from the scope of the invention, the outer plies may be wet laid using a conventional technique (CWP) and form the two outer faces of the sheet. In this configuration, the inner plies may be produced using a TAD type of technique.

Of course, a combination of plies aimed at producing a sheet that has one face formed of a conventional ply and one face formed using a TAD type technique may also be produced without departing from the scope of the invention.

One of the possible combinations will be chosen according to the particular circumstance, that is to say according to the feel, the absorption, the flexibility mainly desired, or alternatively according to constraints of an economic nature.

Furthermore, it is perfectly conceivable to produce a sheet according to the invention without using adhesive to associate the plies, whatever the nature of each of the plies (or group of plies) of which said sheet is made.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A substantially rectangular multi-ply disintegratable absorbent paper sheet based on tissue comprising at least three plies, wherein the disintegratable absorbent paper sheet has a coefficient $K_{NOVE}$ greater than 75,000 wherein $K_{NOVE}$ is defined as $K_{NOVE} = R_{SM} \times R_{ST} \times A \times G \times e^{(12 \times (E+E_P))} \times (1/e^{(Sp)})$, and $R_{ST}$=strength in the cross direction of the paper sheet, in N/m $R_{SM}$=strength in the machine direction of the paper sheet, in N/m G=basis weight of the paper sheet in kg/m$^2$ E=thickness of the paper sheet in mm Sp=flexibility of the paper sheet in N A=absorption of the paper sheet in kg/m$^2$ $E_P$=mean thickness of one ply of the paper sheet in mm, wherein $E_P$ is greater than 0.115 mm, wherein $K_{NOVE} \times e^{(D)} > 100{,}000$, D being a softness value ranging between −3 and +3 and being calculated as an average of softness scores given by testing individuals, and wherein the paper sheet displays a tensile strength in the machine direction ranging between about 400 N/m and about 1000 N/m and displays a tensile strength in the cross direction ranging between about 200 N/m and about 500 N/m.

2. The paper sheet of claim 1, wherein said paper sheet comprises at least one group of plies, the plies in each group of plies being joined to each other by mechanical deformation, the total number of plies in the paper sheet being between 4 and 12 plies.

3. The paper sheet of claim 1, wherein the ply forming at least one of the external surfaces of said paper sheet is formed from TAD basesheet.

4. The paper sheet of claim 1, wherein said paper sheet displays a tensile strength in the machine direction greater than about 700 N/m.

5. The paper sheet of claim 1, wherein said paper sheet displays a tensile strength in the cross direction of above 300 N/m.

6. The paper sheet of claim 1, wherein each ply is joined to another ply.

7. The paper sheet of claim 1, wherein said paper sheet has a length of about 140 mm and a width of about 110 mm.

8. A roll comprising a collection of paper sheets of claim 7, wherein said paper sheet comprises between 60 and 120 paper sheets.

* * * * *